United States Patent
Umetsu

(10) Patent No.: US 6,498,957 B1
(45) Date of Patent: Dec. 24, 2002

(54) POWER SUPPLY CONTROL IN PORTABLE DATA TERMINAL

(75) Inventor: Masakazu Umetsu, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/432,162

(22) Filed: Nov. 2, 1999

(30) Foreign Application Priority Data

Nov. 4, 1998 (JP) ............................................. 10-313775

(51) Int. Cl.⁷ .............................................. G05B 11/01
(52) U.S. Cl. .............................. 700/22; 700/19; 700/20; 700/79; 700/82; 710/8; 710/62; 710/67; 365/203; 365/229; 365/226; 320/117; 320/120; 320/121; 320/134
(58) Field of Search ............................... 700/17–20, 83, 700/21–23, 78–82; 713/300, 320, 321, 322, 323, 324, 340, 310, 330; 365/203, 229, 226; 710/8, 62, 67; 320/116, 117, 120, 121, 124, 125, 126, 127, 134

(56) References Cited

U.S. PATENT DOCUMENTS

| | | | | |
|---|---|---|---|---|
| 5,371,456 A | * | 12/1994 | Brainard ..................... | 320/161 |
| 5,410,713 A | * | 4/1995 | White et al. ................. | 307/66 |
| 5,450,003 A | * | 9/1995 | Cheon ......................... | 323/272 |
| 5,548,763 A | * | 8/1996 | Combs et al. ............... | 713/323 |
| 5,563,493 A | * | 10/1996 | Matsuda et al. ............. | 320/124 |
| 5,710,931 A | * | 1/1998 | Nakamura et al. ........... | 307/66 |
| 5,737,616 A | * | 4/1998 | Watanabe .................... | 700/286 |
| 5,867,007 A | * | 2/1999 | Kim ............................ | 320/118 |
| 5,930,110 A | * | 7/1999 | Nishigaki et al. ........... | 361/686 |
| 5,944,828 A | * | 8/1999 | Matsuoka .................... | 307/66 |
| 5,973,479 A | * | 10/1999 | Pomo et al. ................. | 16/257 |
| 5,974,551 A | * | 10/1999 | Lee ............................. | 713/300 |
| 5,978,922 A | * | 11/1999 | Arai et al. ................... | 713/323 |
| 6,006,335 A | * | 12/1999 | Choi et al. .................. | 713/300 |
| 6,060,789 A | * | 5/2000 | Yamaguchi .................. | 307/64 |
| 6,199,168 B1 | * | 3/2001 | Miller ......................... | 320/106 |
| 6,237,100 B1 | * | 5/2001 | Cromer et al. ............... | 713/202 |

FOREIGN PATENT DOCUMENTS

| | | |
|---|---|---|
| JP | 3-223916 | 10/1991 |
| JP | 6-311666 | 11/1994 |
| JP | 2648117 | 5/1997 |
| JP | 9-179663 | 7/1997 |

* cited by examiner

*Primary Examiner*—Ramesh Patel
(74) *Attorney, Agent, or Firm*—Foley & Lardner

(57) ABSTRACT

A data terminal apparatus includes a basic unit, a plurality of units, a power supply circuit, switching units and a controller. The basic unit realizes a basic function of the data terminal apparatus and requires a basic quantity of DC power. Each of the plurality of units realizes a specific function of the data terminal apparatus and requires quantities of DC power. The power supply circuit receives DC power from a power supply source, and can supply the DC power to the basic unit and the plurality of units. The switching units are provided for the plurality of units, and each of the switching units selectively supplies the DC power from the power supply circuit to a corresponding one of the plurality of units in response to a switching control signal. The controller selectively outputs the switching control signals to the switching units based on the DC power of the power supply source.

12 Claims, 7 Drawing Sheets

Fig. 2

| | EXTERNAL POWER SUPPLY SOURCE CAPACITY | ID INFORMATION ID0 | ID INFORMATION ID1 |
|---|---|---|---|
| ADAPTER A | 40W | 0 | 0 |
| ADAPTER B | 30W | 0 | 1 |
| ADAPTER C | 20W | 1 | 0 |
| ADAPTER D | 10W | 1 | 1 |

| | POWER SUPPLY SOURCE CAPACITY | BASIC FUNCTION 15W | FUNCTION A 10W (DVD DRIVE) | FUNCTION B 10W (PC CARD DRIVE) | FUNCTION C 5W (USB PORT) |
|---|---|---|---|---|---|
| CASE 1 | ADAPTER : ADAPTER A [40W] BATTERY : NO OR BATTERY A, B | ○ | ○ | ○ | ○ |
| CASE 2 | ADAPTER : NO BATTERY : BATTERY B [30W] | ○ | × | ○ | ○ |
| CASE 3 | ADAPTER : NO BATTERY : BATTERY B [30W] | ○ | ○ | × | ○ |
| CASE 4 | ADAPTER : NO BATTERY : BATTERY C [20W] | ○ | × | × | ○ |

12-2

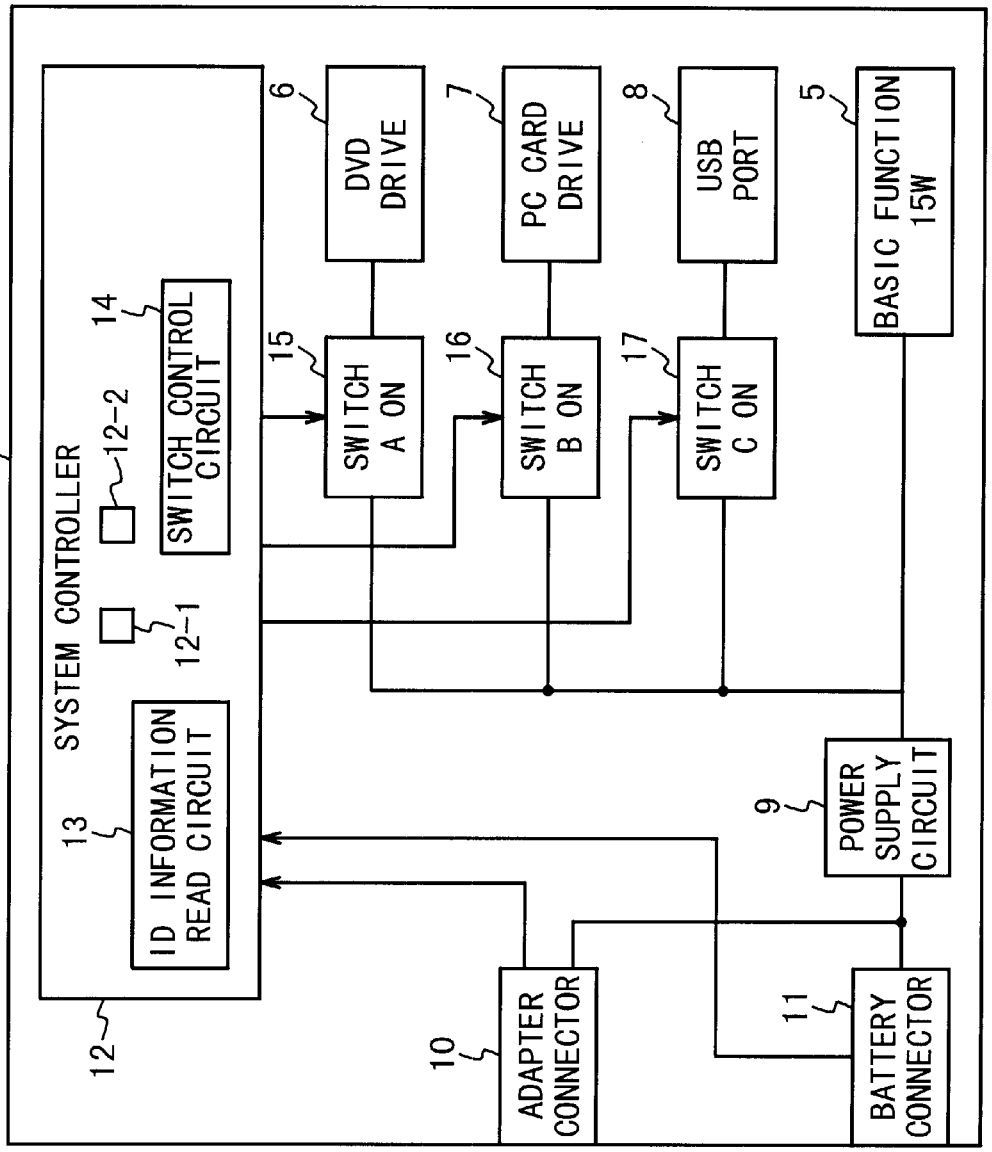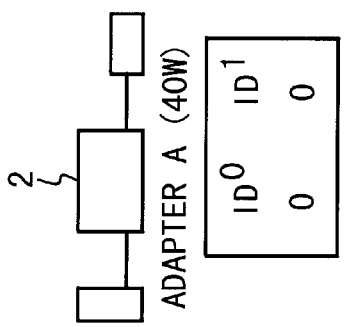

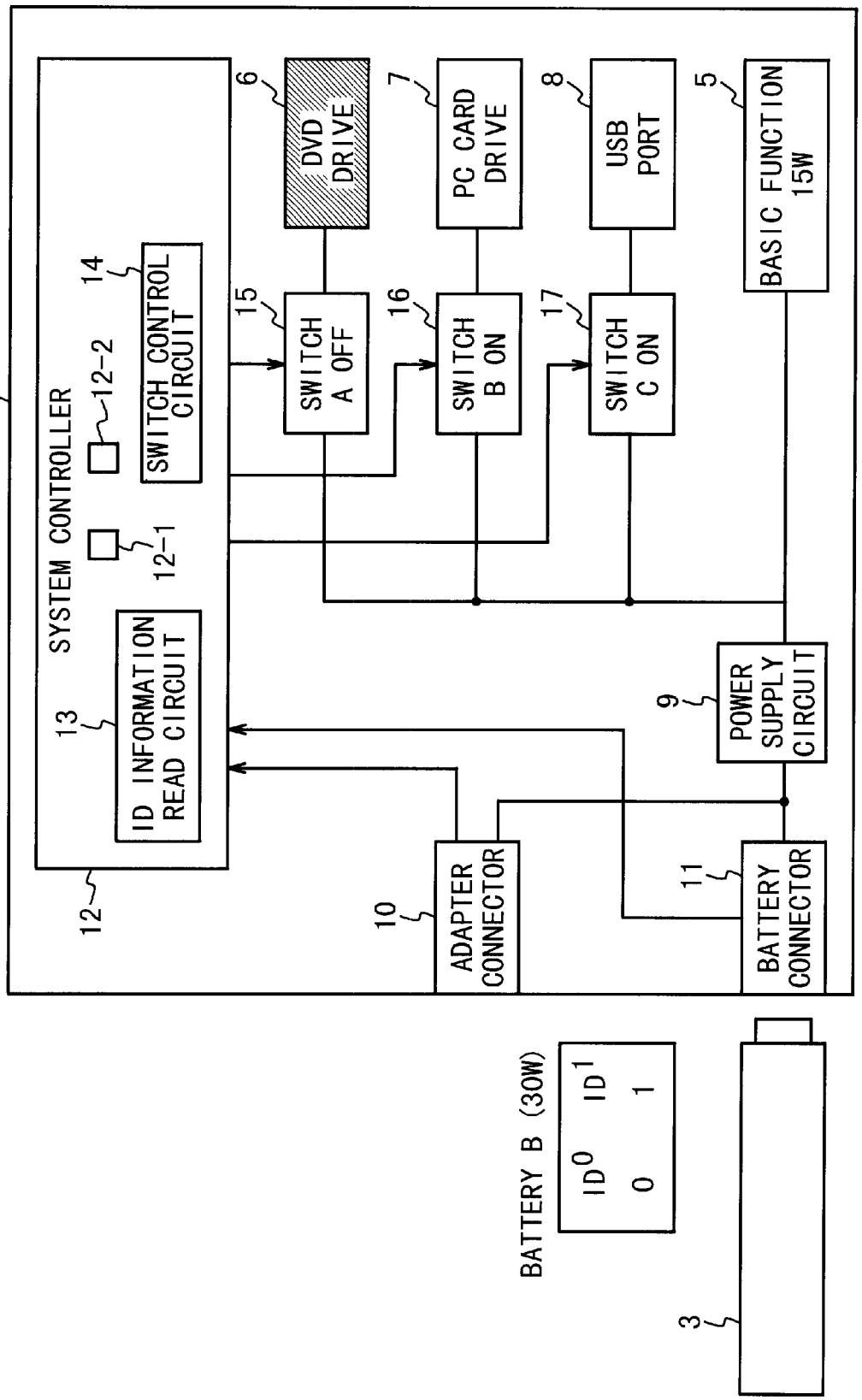

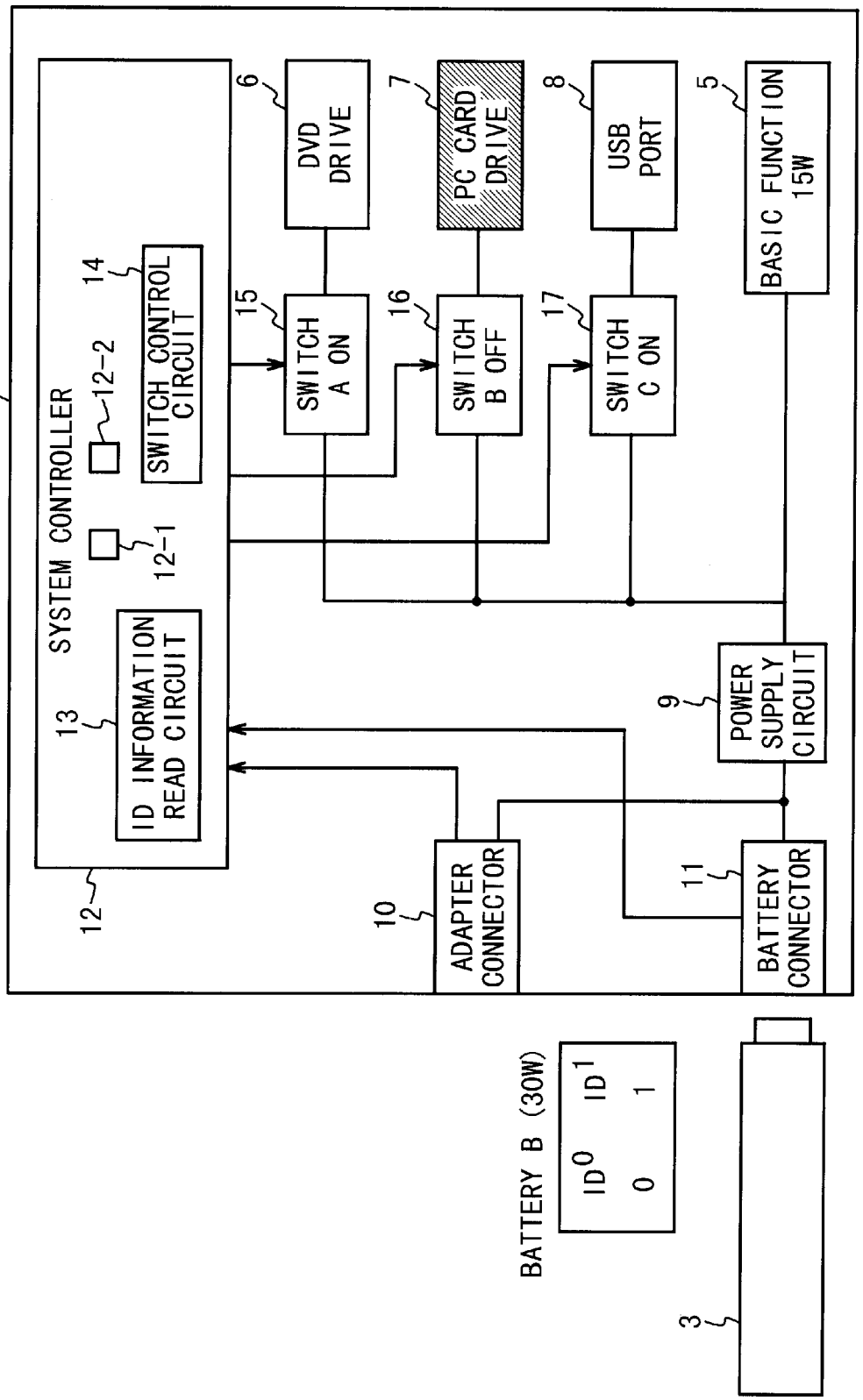

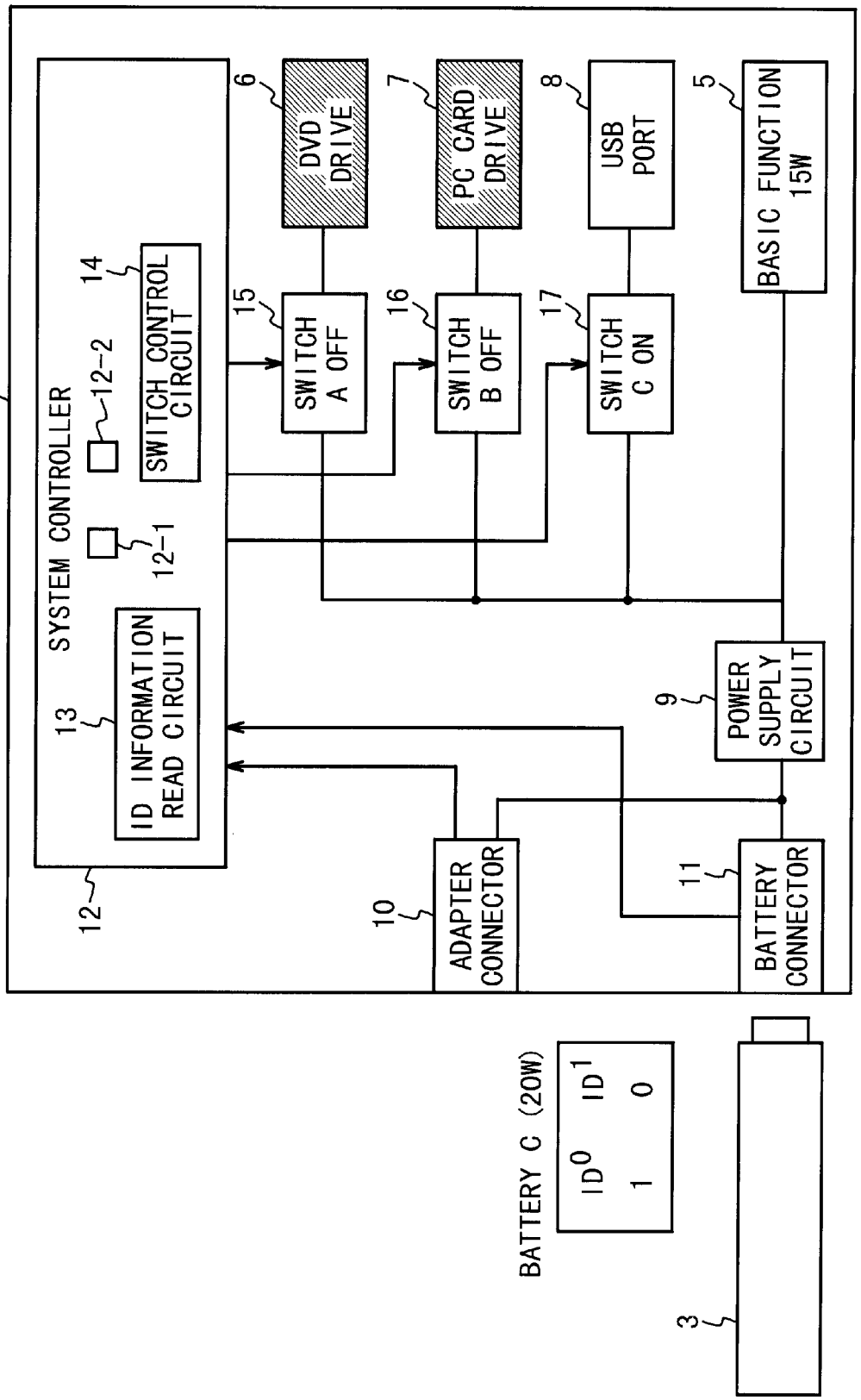

POWER SUPPLY CONTROL IN PORTABLE DATA TERMINAL

BACKGROUND OF THE INVENTION

1. Field of the Invention

The present invention relates to a power supply control system in a portable data terminal, and more particularly, to a power supply control system of a portable data terminal.

2. Description of the Related Art

Conventionally, a power supply control system for a portable data terminal such as a portable personal computer has been developed to have a small size and to allow the portable data terminal to be possible to operate for a long time.

A drive circuit such as a floppy drive or a compact disk drive is recently provided for a portable personal computer or as an extension unit for the portable personal computer. The required supply capability of a power supply source becomes large with the enhancement of performance of the portable personal computer, so that the large capability power supply source is being developed. In the above case, a conventional small capability power supply source cannot cope with the new portable personal computer with high performance and resources are not effectively utilized.

In conjunction with the above description, a portable personal computer is disclosed in Japanese Patent No. 2648117. In this reference, the portable personal computer includes a plurality of component units with storage units for storing quantities of necessary power of the components units, respectively. An internal battery is provided in the personal computer to supply DC power. In addition, an AC adapter is provided to produce and supply DC power from commercial AC power source. An internal power supply receives the power supplied from the internal battery or the AC adapter and supplies the necessary powers to the component units. A charger performs a charging operation of the internal battery by the power supplied from the AC adapter when an operation instruction signal indicates a charge enable state, and stops the charging operation of the internal battery when the operation instruction signal indicates a charge disable state. A calculating unit collects the quantity of necessary power from each of the storage units of the component units each time a power supply switch is turned on or a system configuration of the portable personal computer s changed, and calculates a total quantity of necessary power. A comparator compares the total quantity of necessary power and a first quantity of power P1. Then, the comparator supplies the operation instruction signal indicating the charge enable state to the charger when the total quantity of necessary power is less than the first quantity of power P1, and the operation instruction signal indicating the charge disable state to the charger when the total quantity of necessary power is larger than the first quantity of power P1.

SUMMARY OF THE INVENTION

Therefore, an object of the present invention is to provide a power supply control system in a portable data terminal which can control the operations of function components of the portable data terminal based on the power supply capability of a power supply source.

In order to achieve an aspect of the present invention, a data terminal apparatus includes a basic unit, a plurality of units, a power supply circuit, switching units and a controller. The basic unit realizes a basic function of the data terminal apparatus and requires a basic quantity of DC power. Each of the plurality of units realizes a specific function of the data terminal apparatus and requires quantities of DC power. The power supply circuit receives DC power from a power supply source, and can supply the DC power to the basic unit and the plurality of units. The switching units are provided for the plurality of units, and each of the switching units selectively supplies the DC power from the power supply circuit to a corresponding one of the plurality of units in response to a switching control signal. The controller selectively outputs the switching control signals to the switching units based on the DC power of the power supply source.

Here, the power supply source may be one of an AC adapter producing the DC power from an AC power and a battery. In this case, the power supply source has a specific data. The data terminal apparatus further includes an interface unit with which the power supply source is connected and which supplies the DC power from the power supply source to the power supply circuit. The controller reads the specific data from the power supply source through the interface unit and selectively outputs the switching control signals to the switching units based on the specific data. Also, the controller ay include a first table and a second table. The first table stores sets of a power indication data and the specific data. The second table stores a necessary power quantity of the basic unit, and a necessary power quantity of each of the plurality of units. The controller refers to the first table to determine the power indication data, and selectively outputs the switching control signals to the switching units based on the power indication data and the necessary power quantity of the basic unit, and the necessary power quantity of each of the plurality of units.

The controller may dynamically selectively output the switching control signals to the switching units based on the DC power of the power supply source.

Also, the plurality of units are input/output units.

In addition, the controller may output one of a switching ON signal and a switching OFF signal to each of the plurality of units based on the Dc power of the power supply source. Each of the switching units supplies the DC power to a corresponding one of the plurality of units in response to the switching ON signal and stops the supply of the DC power to the corresponding one of the plurality of units in response to the switching OFF signal.

In order to achieve another aspect of the present invention, a method of controlling power supply in a data terminal apparatus, includes:

determining a quantity of DC power which can be supplied;

supplying the DC power to a basic unit of the data terminal apparatus; and selectively supplying the DC power to each of input/output units based on the determined quantity of DC power.

The quantity of DC power which can be supplied, may be supplied from an external power supply source.

Also, when the quantity of DC power which can be supplied is supplied from an external power supply source, the determining includes:

reading a specific data from the power supply source; and determining the quantity of DC power which can be supplied control, based on the specific data.

Also, the selectively supplying may include:

selectively supplying the DC power to each of input/output units based on the determined quantity of DC power and a necessary power quantity of each of the input/output units.

In addition, the selectively supplying may include:

dynamically selectively the DC power to each of input/output units based on the determined quantity of DC power and a necessary power quantity of each of the input/output units.

BRIEF DESCRIPTION OF THE DRAWINGS

FIG. 2 is a power supply source table in the power supply control system of the data terminal of the present invention;

FIG. 3 is a power dependent operation permitting table in the power supply control system of the portable data terminal of the present invention;

FIG. 4 is a block diagram showing the structure of the power supply control system of a portable personal computer as the data terminal according to the first embodiment of the present invention when an AC adapter is connected with the portable personal computer;

FIG. 5 is a block diagram showing the structure of the power supply control system of the portable personal computer according to the first embodiment of the present invention when a first battery is connected with the portable personal computer;

FIG. 6 is a block diagram showing the structure of the power supply control system of the portable personal computer according to the first embodiment of the present invention when a second battery is connected with the portable personal computer; and FIG. 7 is a block diagram showing the structure of the power supply control system of the portable personal computer according to the first embodiment of the present invention when a third battery is connected with the portable personal computer.

DESCRIPTION OF THE PREFERRED EMBODIMENTS

Figure 1:
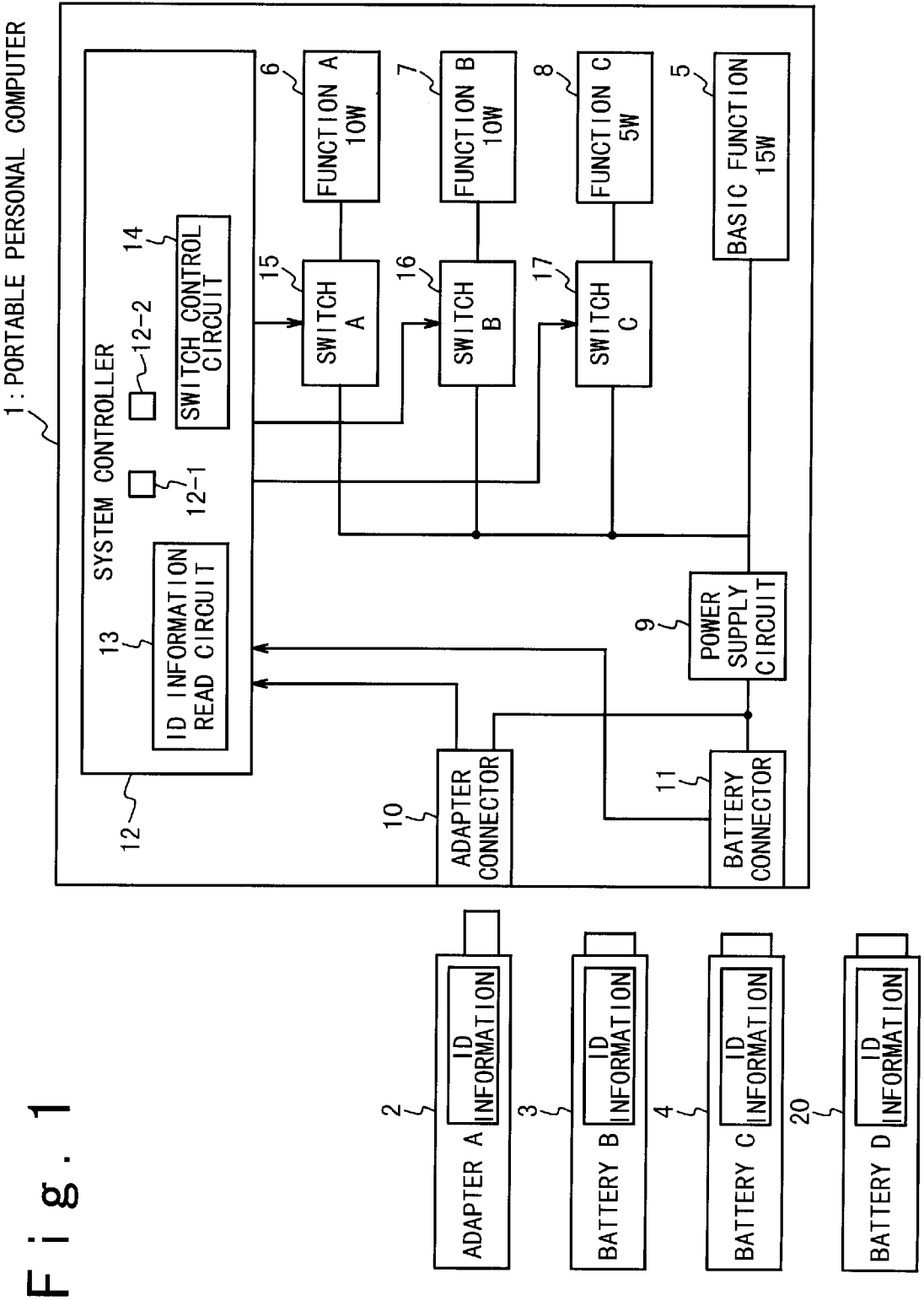
FIG. 1 is a block diagram showing the structure of a power supply control system of a portable data terminal of the present invention.

A power supply control system of a portable data terminal of the present invention will be described below in detail with reference to the attached drawings.

FIG. 1 is a block diagram showing the structure of a power supply control system of a portable personal computer as an example of the portable data terminal according to the first embodiment of the present invention. Referring to FIG. 1, the portable personal computer 1 is composed of a system controller 12, an adapter connector 10, a battery connector 11, a power supply circuit 9, switches 15, 16 and 17, a basic function section 5, and function sections 6, 7 and 8. The system controller is composed of an ID information read circuit 13, a switch control circuit 14, a power supply source table 12-1 and a power dependent operation permitting table 12-2.

An AC adapter 2 or a battery 3, 4 or 20 as an external power supply source can be connected to the adapter connector 10 or the battery connector 11 in the portable personal computer 1. In the portable personal computer 1, the power supply circuit 9 supplies power to various sections based on the power supplied from the external power supply source.

According to the present invention, ID information containing a data indicative of a power supply capability is stored in each of the AC adapter 2 and batteries 3, 4 and 20.

The ID information read circuit 13 of the system controller has a function to read the ID information from the AC adapter 2 and batteries 3, 4 and 20 and a function to control power supply to the various sections 5 to 8. The system controller 12 reads the ID information from the power supply resource connected to the adapter connector 10 or the battery connector 11 to determine the power supply capability of the external power supply source, or power supply quantity which can be externally supplied. Then, the system controller 12 carries out power supply control for every section of the personal computer based on the power supply quantity required by each of the sections 5 to 8. Therefore, when the power supply source such as the AC adapter 2 having a large power supply capability is connected to the adapter connector 10 of the portable personal computer 1, the personal computer 1 can operate fully. Also, when the power supply source such as the batteries 5 to 8 having a small power supply capability is connected to the battery connector 11 of the portable personal computer 1, the personal computer 1 can be used partially.

Referring to FIG. 1, the adapter A 2 has the power supply capability of 40 W. The battery B 3, the battery C 4 and the battery D 20 have the power supply capabilities of 30 W, 20 W and 10 W, respectively. These power supply sources have the ID information containing data indicative of power supply capability of each of the power supply sources 2, 3, 4 and 20.

The portable personal computer 1 has the basic function section 5 which is necessary for the minimum operation as a computer system. For example, the basic function section 5 includes a CPU, a memory and a display (not shown), and may include a hard disk (not shown). The basic function section 5 requires the power of 15W. Also, the function sections A to C 6 to 8 include peripheral units or input/output units such as drive circuits. The function sections A to C 6 to 8 require the powers of 10 W, 10 W, and 5 W, respectively.

The adapter connector 10 and the battery connector 11 are the interfaces for the external power supply sources. The power is supplied from the external power supply source to the power supply circuit 9 via the connector 10 or 11. The power supply circuit 9 converts the voltage of the external power supply source to internal power supply voltages necessary for the computer system and supplies to the various functions 5 to 8. That is, the power is supplied from the power supply circuit 9 directly to the basic function section 5. Also, the power is supplied from the power supply circuit 9 to the function section 6 to 8 via the switches A to C 15 to 17, respectively.

In this case, although the method of reading the ID information is not limited, two ID signals may be allocated to the connector 10 or 11 as power supply capability distinguishing signals ID0 and ID1 of the power supply source. The ID information read circuit 13 reads the power supply capability distinguishing signals ID0 and ID1 and refers to the power supply source table 12-1 shown in FIG. 2 based on the signals ID0 and ID1 to determines the power supply capability of the external power supply source connected to the portable personal computer 1. When the power supply capability of the power supply source is less than the power necessary for the whole system, the additional function sections 6 to 8 are selectively set to a disable state, i.e., the power is not supplied to the selected ones of the additional functions. Thus, the system can be set to an operable state.

The switch control circuit 14 refers to a power dependent operation permitting table 12-2 based on the power supply capability of the external power supply source to determine which of the switch circuits A to C 15 to 17 should be turned on. When the switch circuit A 15, the switch circuit B 16 and the switch circuit C 17 are turned on, the power is supplied to the function section A 6, the function section B 7 and the function section C 8. The ON/OFF control of the switch circuit A 15, the switch circuit B 16 and the switch circuit C 17 is carried out by the switch control circuit 14 of the system controller 12, as described above. The ON/OFF control is carried out in accordance with the power supply capability of the power supply source to be connected with the portable personal computer 1. The ON/OFF control may be carried out fixedly or dynamically such that the required power is less than the power supply capability of the power supply source. As described above, the power supply capability is determined based on the ID information which is read from the above-mentioned power supply sources by the ID read circuit 13 of the system controller 12.

FIG. 4 shows an operation state of the portable personal computer 1 in a first embodiment of the present invention. Referring to FIG. 4, the power quantities necessary for the basic function section 5, the function section A 6, the function section B 7 and the function section C 8 are set to be 15 W, 10 W, 10 W and 5 W. Therefore, the power of 40 W is necessary for the whole computer system.

In a conventional example, when the power of 40 W is necessary for the whole system, the power supply source needs to have the power supply capability of 40 W or above. On the other hand, in the present invention, the portable personal computer 1 can partially operate if the personal computer 1 is connected to the power supply source which has the power supply capability less than the maximum power necessary to fully operate the personal computer 1. For example, the power supply capabilities of the adapter A 2, battery B 3, battery C 4 and battery D 20 are set to be 40 W, 30 W, 20 W and 10 W in this embodiment.

In this example, it is supposed that the function A 6 is a DVD drive, the function B 7 is a PC card drive and the function C 8 is a USB drive.

The case 1 where the AC adapter 2 of 40W is connected to the portable personal computer 1 will be described with reference to FIG. 4.

At first, the ID information of the power supply source 2 is read by the ID information read circuit 13 so that the system controller 12 distinguishes the power supply capability of the power supply source. The adapter 2 has the ID information of ID0:0 and ID1:0. The ID information read circuit 13 refers to the power supply source table to determine that the power supply capability of the power supply source is 40 W. In this case, all function sections 5 to 8 can be supplied with the power, because the power supply capability of the power supply source is the same as the power supply capability of 40 W necessary for the whole system. Therefore, the power supply control is carried out to various function sections 6 to 8 by the switch control circuit 14 based on the power dependent operation permitting table shown in FIG. 3. In this case, the switch control circuit 14 turns on the switch circuit A 15, the switch circuit B 16 and the switch circuit C 17 to supply the power to all the function sections 6 to 8, in addition to the basic function section 5.

Next, the case 2 where the battery B 3 of 30W is connected with the portable personal computer 1 will be described below with reference to FIG. 5.

At first, the ID information of the power supply source is read by the ID information read circuit 13 so that the system controller 12 distinguishes the power supply capability of the power supply source. The battery B 3 has the ID information of ID0:0 and ID1:1. The ID information read circuit 13 refers to the power supply source table 12-1 of FIG. 2 to determine that the power supply capability of the power supply source is 30 W. In this case, because the power supply capability of the power supply source is less than the power supply capability of 40 W necessary for the whole computer system, the power is not supplied to the functions which needs the power equal to or more than 10 W. Therefore, the power supply control is carried out to the function sections 6 to 8 by the switch control circuit 14 based on the power dependent operation permitting table of FIG. 3. In this case, the switch control circuit 14 turns off the switch circuit A 15 and turns on the switch circuit B 16 and the switch circuit C 17, so that the DVD drive of the function section A 6 is set to the use impossible state.

Next, the case 3 where the battery B 3 of 30W is connected with the portable personal computer 1 will be described with reference to FIG. 6. In this case, because the power supply source is the same as in the case 2, the determination of the power supply capability is omitted. In the case 2, the DVD drive of the function section A 6 is set to the use impossible state. In the case, 3, the PC card drive of the function B 7 is set to the use impossible state, because the PC card drive needs the same power as the function A. This means that the function section may be selected in accordance with the situation, and may be dynamically set to the use impossible state. In this case, the switch control circuit 14 turns on the switch circuit A 15 and the switch circuit C 17 and turns off the switch circuit B 16. Thus, the PC card drive of the function section B 7 is set to the use impossible state.

Next, the case 4 where the battery C 4 of 20 W is connected with the portable personal computer 1 will be described with reference to FIG. 7.

At first, the ID information of the power supply source is read by the ID information read circuit 13 so that the system controller 12 distinguishes the power supply capability of the power supply source. The battery C 4 has the ID information of ID0:1 and ID1:1. The ID information read circuit 13 refers to the power supply source table 12-1 of FIG. 2 to determine that the power supply capability of the power supply source is 20 W. In this case, because the power supply capability of the power supply source is less than the power supply capability of 40 W necessary for the whole system, the power is not supplied to the function which needs the power equal to or more than 20 W. Therefore, the power supply control is carried out to the function sections by the switch control circuit 14 based on the power dependent operation permitting table 12-2 of FIG. 3. In this case, the switch control circuit 14 turns off the switch circuit A 15 and the switch circuit B 16 and turns on the switch circuit C 17, so that the DVD drive of the function A 6 and the PC card drive of the function B 7 are set to the use impossible state.

If the battery D 20 having the power supply capability of 10 W is connected to the portable personal computer 1, the personal computer 1 does not operate.

Next, a second embodiment of the present invention will be described below.

In the second embodiment, the basic structure is same as that of the first embodiment. In the second embodiment, the ID information read circuit 13 is modified. In the above-mentioned description, the ID information of the power supply capability is transmitted to the system controller by two signals. However, in the second embodiment, if a memory of such as serial EEPROM is used for the ID information of the power supply source, a large quantity of information can be stored so that the information of the more detailed power supply source can be obtained. If a serial bus interface is used as the ID information read circuit of the portable personal computer, it is possible to carry out the power supply control more appropriately.

It should be noted that in the above two embodiments, the description is given taking the portable personal computer as an example of the portable data terminal. However, it would be apparent to a person of the art that the present invention can be applied to the data terminal such as a portable digital camera and a portable CD recorder.

Also, in the above description, the power supply source is externally connected to the personal computer 1. However, the battery as the power supply source may be provided in the personal computer 1, and may be charged by the AC adapter.

In this way, according to the present invention, even when a power supply source with a small capability is used for the whole system requiring a power supply source of a large capability, the portable data terminal can be used while limiting a part of the functions to be used.

What is claimed is:

1. A data terminal apparatus comprising:
    a basic unit requiring a basic quantity of DC power;
    a plurality of units requiring predetermined quantities of DC power;
    a power supply circuit receiving DC power from a power supply source, wherein said power supply circuit supplies said DC power to said basic unit and said plurality of units;
    switching units provided for said plurality of units, wherein each of said switching units selectively supplies said DC power from said power supply circuit to a corresponding one of said plurality of units in response to a switching control signal; and
    a controller selectively outputting said switching control signals to said switching units based on said DC power of said power supply source.

2. A data terminal apparatus according to claim 1, wherein said power supply source is one of a battery and an AC adapter producing said DC power from an AC power.

3. A data terminal apparatus according to claim 2, wherein said power supply source has a specific data, and
    wherein said data terminal apparatus further includes an interface unit with which said power supply source is connected and which supplies said DC power from said power supply source to said power supply circuit, and
    wherein said controller reads said specific data from said power supply source through said interface unit and selectively outputs said switching control signals to said switching units based on said specific data.

4. A data terminal apparatus according to claim 3, wherein said controller includes:
    a first table storing sets of a power indication data and said specific data; and
    a second table storing a necessary power quantity of said basic unit, and a necessary power quantity of each of said plurality of units, and
    wherein said controller refers to said first table to determine said power indication data, and selectively outputs said switching control signals to said switching units based on said power indication data and said necessary power quantity of said basic unit, and said necessary power quantity of each of said plurality of units.

5. A data terminal apparatus according to claim 1, wherein said controller dynamically selectively outputs said switching control signals to said switching units based on said DC power of said power supply source.

6. A data terminal apparatus according to claim 1, wherein said plurality of units are input/output units.

7. A data terminal apparatus according to claim 1, wherein said controller outputs one of a switching ON signal and a switching OFF signal to each of said plurality of units based on said DC power of said power supply source, and
    wherein each of said switching units supplies said DC power to a corresponding one of said plurality of units in response to said switching ON signal and stops the supply of said DC power to the corresponding one of said plurality of units in response to said switching OFF signal.

8. A method of controlling power supply in a data terminal apparatus, comprising:
    determining a quantity of DC power available from a power source;
    supplying said DC power to a basic unit of said data terminal apparatus; and
    selectively supplying said DC power to each of input/output units based on said determined quantity of DC power.

9. A method according to claim 8, further comprising supplying said available DC power, from an external power supply source.

10. A method according to claim 8, wherein said available DC power is supplied from an external power supply source, and
    wherein said determining includes:
        reading a specific data from said power supply source; and
        determining said available DC power control, based on said specific data.

11. A method according to claim 8, wherein said selectively supplying includes:
    selectively supplying said DC power to each of input/output units based on said determined quantity of DC power and a necessary power quantity of each of said input/output units.

12. A method according to claim 8, wherein said selectively supplying includes:
    dynamically selectively supplying said DC power to each of input/output units based on said determined quantity of DC power and a necessary power quantity of each of said input/output units.

* * * * *